(12) United States Patent
Stakutis et al.

(10) Patent No.: US 7,188,127 B2
(45) Date of Patent: Mar. 6, 2007

(54) METHOD, SYSTEM, AND PROGRAM FOR PROCESSING A FILE REQUEST

(75) Inventors: Christopher John Stakutis, Concord, MA (US); William Robert Haselton, Peabody, MA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/681,557

(22) Filed: Oct. 7, 2003

(65) Prior Publication Data

US 2005/0076041 A1 Apr. 7, 2005

(51) Int. Cl.
*G06F 12/00* (2006.01)
*G06F 17/30* (2006.01)

(52) U.S. Cl. .............. 707/204; 707/2; 707/5

(58) Field of Classification Search .......... 707/1–10, 707/100–104.1, 200–205
See application file for complete search history.

(56) References Cited

U.S. PATENT DOCUMENTS

| | | | |
|---|---|---|---|
| 5,276,867 A | 1/1994 | Kenley et al. | |
| 5,438,661 A | 8/1995 | Ogawa | |
| 5,457,796 A | 10/1995 | Thompson | |
| 5,463,772 A | 10/1995 | Thompson et al. | |
| 5,495,603 A | 2/1996 | Fruchtman et al. | |
| 5,495,607 A | 2/1996 | Pisello et al. | |
| 5,678,042 A | 10/1997 | Pisello et al. | |
| 5,813,009 A | 9/1998 | Johnson et al. | |
| 5,925,126 A | 7/1999 | Hsieh | |
| 5,991,753 A | 11/1999 | Wilde | |
| 6,240,421 B1 | 5/2001 | Stolarz | |
| 6,321,219 B1 | 11/2001 | Gainer et al. | |
| 6,336,120 B1 | 1/2002 | Noddings et al. | |
| 6,438,642 B1 | 8/2002 | Shaath | |
| 6,460,055 B1 * | 10/2002 | Midgley et al. | ............ 707/204 |

(Continued)

FOREIGN PATENT DOCUMENTS

EP 0 947 932 10/1999

(Continued)

OTHER PUBLICATIONS

U.S. Appl. No. 10/680,953, filed Oct. 7, 2003, entitled "Method System and Program for Retaining Versions of Files", by C. J. Stakutis and K. M. Stearns.

(Continued)

*Primary Examiner*—Mohammad Ali
*Assistant Examiner*—Navneet K Ahluwalia
(74) *Attorney, Agent, or Firm*—David W. Victor; Konrad Raynes & Victor LLP

(57) ABSTRACT

Provided are a method, system, and program that processes a file request to operate on a target file that is directed to a file system. A determination is made as to whether a rule specifies a file attribute satisfied by the target file. In response to determining that the target file satisfies the file attribute of the determined rule, a determination is made as to whether a condition specified by the determined rule is satisfied. In response to determining that the condition is satisfied, an action specified by the determined rule is performed. The file request is forwarded to the file system to execute if the rule does not inhibit the file request.

24 Claims, 5 Drawing Sheets

U.S. PATENT DOCUMENTS

| | | |
|---|---|---|
| 6,546,404 B1 | 4/2003 | Davis et al. |
| 6,549,916 B1 | 4/2003 | Sedlar |
| 2001/0044904 A1 | 11/2001 | Berg |
| 2002/0046320 A1 | 4/2002 | Shaath |
| 2002/0133738 A1 | 9/2002 | Zeigler et al. |
| 2002/0166079 A1 | 11/2002 | Ulrich et al. |
| 2002/0174329 A1 | 11/2002 | Bowler et al. |
| 2003/0070071 A1 | 4/2003 | Riedel et al. |
| 2004/0034794 A1* | 2/2004 | Mayer et al. ............... 713/200 |
| 2004/0064543 A1* | 4/2004 | Ashutosh et al. ........... 709/224 |

FOREIGN PATENT DOCUMENTS

| | | |
|---|---|---|
| JP | 10143407 | 5/1998 |
| JP | 2001075786 | 3/2001 |
| WO | WO-00/57275 | 9/2000 |

OTHER PUBLICATIONS

U.S. Appl. No. 10/681,558, filed Oct. 7, 2003, entiled "Method System and Program for Archiving Files", by C. J. Stakutis, W. R. Haselton, K. M. Stearns, A. L. Stuart, and T. L. Marek.

* cited by examiner

METHOD, SYSTEM, AND PROGRAM FOR PROCESSING A FILE REQUEST

BACKGROUND OF THE INVENTION

1. Field of the Invention

The present invention is related to a method, system, and program for processing a file request.

2. Description of the Related Art

In shared computing environments, application programs are often used to provide data protection, storage space management, and security. For instance, certain storage management applications may be used to maintain mirrored back-up copies of files and data. Such applications will often block access to a file that is in the process of being mirrored until the initial mirror copy operation is complete. Mission critical applications that require immediate acknowledgment when accessing a file may experience problems if delays occur while waiting to access the file subject to the mirror copy relationship that is being initially copied to the mirror file. Additional application programs may be provided to provide data security and space management. Storage management applications typically utilize customized graphical user interfaces (GUIs) and application program interfaces (APIs) to interface with the operating system to perform archival related operations. Users may have to undergo significant training to learn to use these different application programs, which are often complex especially in enterprise computing environments, to perform the different storage management operations, such as data protection, security, and space management. Moreover, to manage and perform the different storage management operations, users must actively invoke and use the installed applications that may often consume significant computing resources and require dedicated hardware and software components, such as databases.

SUMMARY OF THE PREFERRED EMBODIMENTS

Provided are a method, system, and program that processes a file request to operate on a target file that is directed to a file system. A determination is made as to whether a rule specifies a file attribute satisfied by the target file. In response to determining that the target file satisfies the file attribute of the determined rule, a determination is made as to whether a condition specified by the determined rule is satisfied. In response to determining that the condition is satisfied, an action specified by the determined rule is performed. The file request is forwarded to the file system to execute if the rule does not inhibit the file request.

In further implementations, determining whether the rule specifies the file attribute comprises processing a rules database including a plurality of rules, where each rule indicates a file attribute, a condition, and an action performed if the condition and file attribute are satisfied.

Still further, the rules in the rules database may implement space management, security, and data protection policies.

Further provided are a method, system, and program for processing a request to update a file in a file system with update data. The update request to a target file that is directed to the file system is processed, wherein the target file is subject to a mirror copy relationship with a mirror file. A determination is made as to whether a copy operation from the target file to the mirror file is in progress and whether bytes to update in the target file have been copied to the mirror file in response to determining that the copy operation is in progress. The update data is copied to the bytes to update in the target file in response to determining that the bytes to update have not been copied to the mirror file, wherein the update data is subsequently copied to the mirror file during subsequent progress of the copy operation.

In further implementations, the update data is copied to the bytes to update in the target file and to the mirror file in response to determining that the bytes to update have been copied to the mirror file.

Still further, the progress of the copy operation is monitored in response to determining that the bytes to update are currently being copied to the mirror file. The update data is copied to the bytes to update in the target file and to the mirror file in response to determining that the bytes to update have been copied to the mirror file while monitoring the progress of the copy operation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
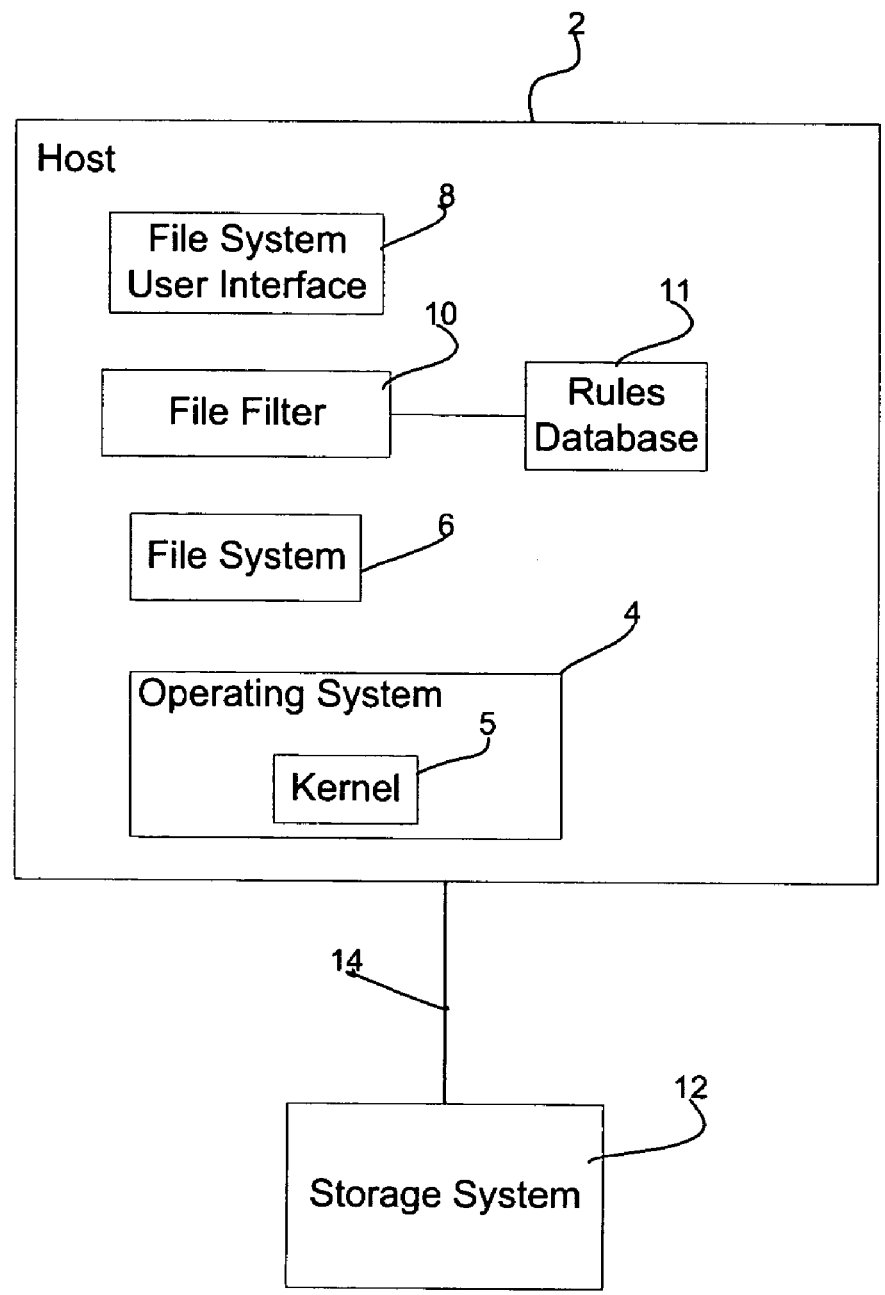
FIG. 1 illustrates a computing environment in which embodiments of the invention are implemented.

FIG. 1 illustrates a computing environment in which embodiments of the invention may be implemented. A host system 2 includes an operating system 4 and a file system 6 that provides an organization of files stored in a storage device. The file system 6 may provide a hierarchical tree-like arrangement of files, which may involve the use of directories and subdirectories in which the files may be stored, where any directory may comprise a subdirectory of another directory or the root directory. A file system user interface 8 provides a command line or graphical user interface to enable the user to explore the file system and perform file system related operations, such as moving a file to a specified directory, deleting a file, renaming a file, creating a file, etc. The file system user interface 8 may comprise a file management program that renders a presentation of the hierarchical arrangement of files. The file system user interface 8 may comprise a stand alone file management program or a file management function accessed through an application program.

A file filter 10 programs intercepts user file requests generated through the file system user interface 8 or from an application program (not shown) directed to the file system 6, determines whether any storage management policies should be applied, and determines whether to block the requested file operation or allow the operation to proceed to the file system 6 to execute. In certain embodiments, the filter 10 executes in a kernel 5 of the operating system 4 as a high priority task.

The file system 6 may provide access to files stored in the storage system 12 via connection 14. A rules database 11 provides a list of one or more rules which specifies actions to perform with respect to files having certain attributes specified in the rules. The rules database 11 may be implemented in data structures known in the art, such as an ASCII text file, an Extensible Markup Language (XML) file, relational database, etc. The file filter 10 would access the rules database 11 when filtering file operations to determine whether a rule applies to the file being accessed and what action to take.

The host system 2 may comprise any computing device known in the art, such as a server class machine, workstation, desktop computer, etc. The storage system 12 may comprise a storage device known in the art, such one or more interconnected disk drives configured as a Redundant Array of Independent Disks (RAID), Just a Bunch of Disks (JBOD), Direct Access Storage Device (DASD), as a tape storage device, e.g., a tape library, a single or multiple storage units, etc. The connection 14 may comprise any interface between storage and a host known in the art, such as a network connection (e.g., Ethernet, wireless ethernet, Fibre Channel, etc.) or any other data transfer interface known in the art, e.g., Advanced Technology Attachment (ATA), Serial ATA (SATA), Small Computer System Interface (SCSI), etc., which may be external or internal to the host 2 enclosure.

In implementations where the file filter 10 executes in the kernel 5 of the operating system 6, the operations of the file filter 10 remain transparent to the user and the user is unaware of the rule based checking and file management operations the file filter 10 performs as an extension of the operating system 6. Further, in certain implementations, the file filter 10 extension for the file system may be written for different operating systems and file systems. In this way, the file filter 10 would perform the same functions and operate in a similar manner across file systems, thereby standardizing the filter operations across operating system platforms to provide a similar user interface to allow the user to create rules to control the filtering operations regardless of the operating system and file system in which the user is operating.

Figure 2:
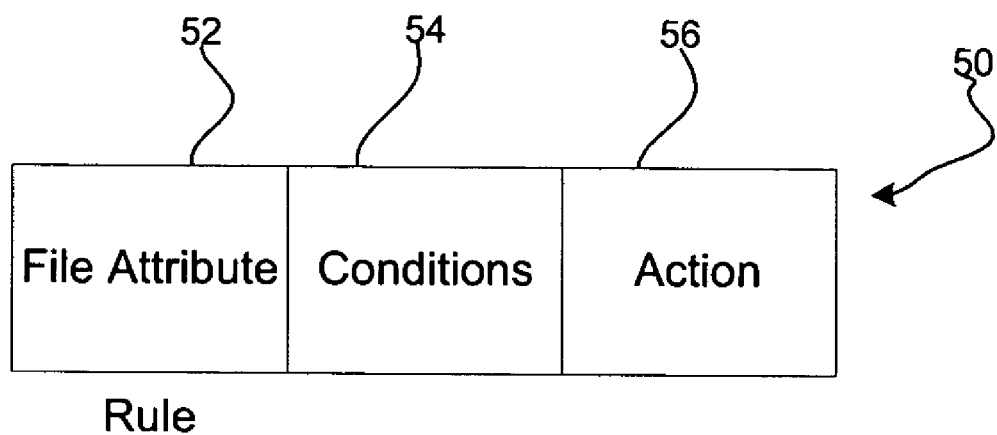
FIG. 2 provides information maintained in a storage management rule in accordance with implementations of the invention.

FIG. 2 illustrates a rule entry 50 in the rule database 11. Each rule entry may indicate:

file attribute(s) 52: one or more attributes of a file to which the rule applies, where the attribute may comprise a specific file name, a directory name, a file size, file type, creator of file, date, an application or user initiating the request, etc.

conditions 54: specifies conditions with respect to a file satisfying the file attributes 52 that must exist before the specified action 56 is performed. The condition may specify a file size, type, file name, etc. or some other condition related to a file or related to some parameter external to the file, such as available storage space in the host, etc. The condition may also indicate an attribute of an I/O request directed to the file, such as the source of the application program originating the request, the user initiating the request, etc. For instance, a security rule may have conditions specifying users and/or applications which have permission to access the file. Still further, the condition may apply only to a specific type of I/O request, such as only to write requests or reads. For instance, a data protection rule to make sure updates are applied to a mirror copy of a file may apply to any writes to a file having the specified attribute, or a security rule may restrict reads and/or writes to a specific file based on a condition of user identity, such as if the user initiating the request does not have a specified identity. The condition and attribute information may be combined, such that the attribute itself comprises a condition of a target file to which the action is performed should the attribute/condition be satisfied.

action 56: specifies an action to perform if the condition 54 is satisfied with respect to files having the one or more file attributes 52. For a security rule, the action may permit a certain level of access, such as read only, read and write, etc. For a data protection rule, the action may specify to copy any updates or changes to a mirror copy, etc.

Figure 3:
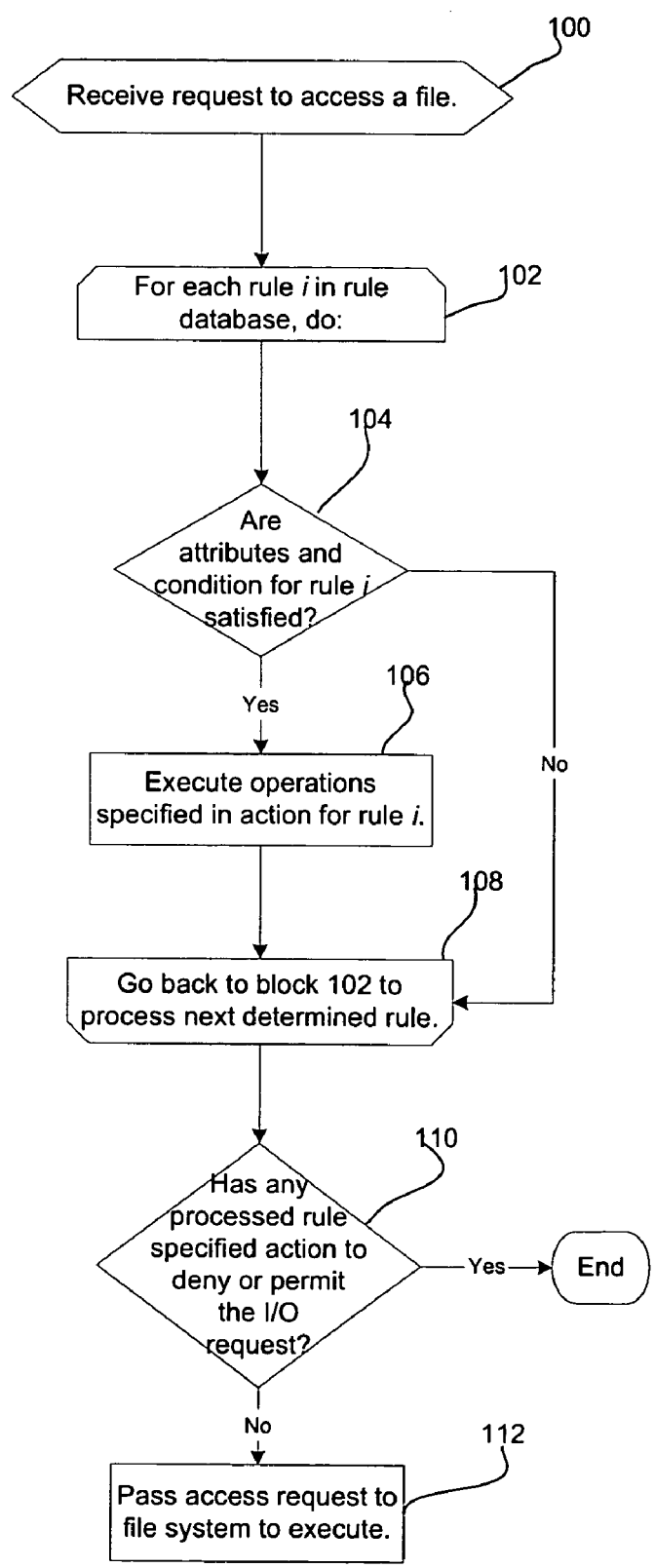
FIGS. 3 and 4 illustrate storage management operations in accordance with implementations of the invention.

FIG. 3 illustrates operations performed by the file filter 10 to process the rules database 11 when receiving an I/O request directed to a target file represented in the file system 6. In response to receiving the I/O request (at block 100), for each rule i in the rules database 11, a loop is performed at blocks 102 through 108. If (at block 104) the one or more attributes 52 and conditions 54 specified for rule i are satisfied by the target file and any other parameters concerning or external to the target file, then the operations specified in the action 56 for rule i are executed (at block 106). After executing the actions (from block 106) or if the condition is not satisfied (from the no branch of block 104), control proceeds (at block 108) to consider any further rules in the rules database 11. After processing all rules, if (at block 112) no rule has specified an action to deny or allow the I/O request, then the file filter 10 passes the I/O request to the file system 6 to execute.

As discussed, the attributes, conditions, and actions can vary depending on the type of security, data protection or space management policy defined by the rule. For security oriented rules, the attribute 52 may specify a directory path, file name, file type, etc. or any other attribute of a target file and the condition 54 may specify a group of one or more users or applications permitted to access the target file. The security condition 54 may be multi-tiered, such as check for a particular type of one or more I/O requests, e.g., read, write, delete, rename, modify, move, etc., and identity of user or application attempting to access the file. The user identity may specify a specific user or a larger workgroup with which the user is associated. The security condition may further specify a pass code that must be associated with the I/O request in order to permit access. The action 56 may specify to allow access, deny access, etc. Further, the action may specify to allow access if the condition is satisfied and deny access if not. Still further, the security policy may check the content of files having certain attributes when the request is a write to determine whether the file includes malicious code, such as a virus or worm, and specify a blocking action if the condition of malicious code is satisfied. Still further, the action may call an external function to perform checking operations.

For space management rules, the attribute 52 may specify path, file name, file type, etc. or any other attribute to identify a target file and the condition 54 may specify that an attribute of the file satisfy a condition, such as a size condition, file type, etc. The action 56 may specify whether to allow or not allow the I/O request if the file having the specified attribute satisfies the condition. For instance, the space management rule attributes/condition may specify that if a file of a certain type (e.g., MP3, music, video, etc.)

exceeds a size constraint, then such file may not be added. The condition may further check a parameter unrelated to the specific file, such as the available storage space and/or the size of the file to add. In this way the space management rule may limit files of a certain type from being added if their addition would use up too much available storage space or prevent files of a specific type from being added.

For a data protection rule, the rule 50 (FIG. 2) may specify to maintain a mirror copy relationship (the action 56) of a file having a specified attribute/condition, such as a file name, all files in a directory, or all files of a certain type, date or size. If a mirror copy data protection rule is added to the rules database 11, then an initial copy of the one or more file subjects to the mirror copying are copied to the mirror location specified in the action 56. The user may specify through the file system user interface 8 to initialize and maintain a mirror copy file, whereby the user action would both start the process to copy a source file from one location to the mirror location and at the same time add a rule to copy any updates being made to the source to the mirror location. The file subject to a mirror copy may comprise a database or any other type of data object known in the art.

Figure 4:
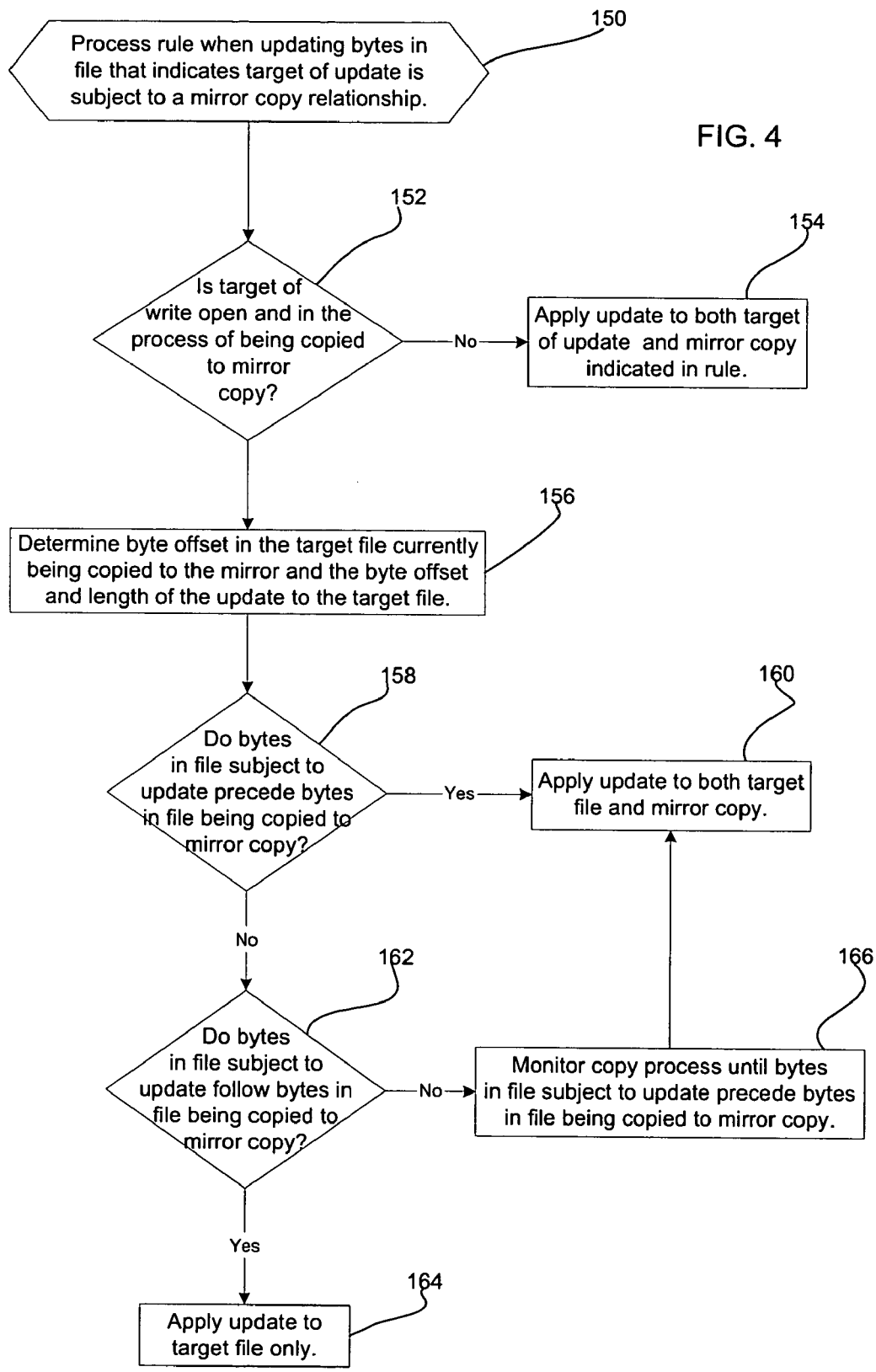

FIG. 4 illustrates operations the file filter 10 performs when receiving an update to a file that according to a rule in the rules database 11 is subject to a mirror copy relationship. Upon receiving such an update (at block 150), if (at block 152) the target of the update is not open and in the process of being copied to a mirror copy file, i.e., has already been copied, then the update is applied (at block 154) to both the target of the write and the mirror copy. Otherwise, if the target of the write is in the process of being copied as part of the initial mirror copying, then the file filter 10 determines (at block 156) the byte offset in the target file currently being copied to the mirror file and the byte offset and length subject to the update to the target file. If (at block 158) the bytes in the file subject to update precede the bytes in the target file currently being copied to the mirror copy, then the update is applied (at block 160) to both the target file and mirror copy because the bytes to update have already been mirrored. Otherwise, if (at block 162) the bytes in the file subject to update follow the bytes in the target file currently being copied to the mirror copy, then the file filter 10 applies (at block 164) the update only to the target file. In such case, the update will be applied to the mirror copy when those updated bytes are subsequently subject to the initial copy operation of the mirror copy.

If (from the no branch of block 162) the bytes subject to the update are in the process of being copied to the mirror copy as part of the initial copy, then the file filter 10 monitors (at block 166) the initial mirror copy process until the bytes in the target file subject to the update precede the bytes in the file currently being copied to the mirror copy file. At such point, when the initial copy has moved beyond the bytes to update, the file filter 10 proceeds to block 160 to apply the update to both the target file and mirror copy.

In the above described logic, the file filter 10 would determine whether to apply the update to the target file or the mirror copy based on which byte in the file was being copied. In alternative implementations, the file filter 10 may make this determination by considering whether the current size of the mirror copy is greater than the byte offsets to update in the target file. Using such technique, the bytes to update have been copied if the mirror copy has more bytes than the last byte in the range to update or the bytes to update in the target file have not been copied to the mirror file if the mirror copy has fewer bytes than the offset of the last byte to update in the target file. Further, one target file in the file system may be associated with multiple mirror copy relationships (rules), such that copies of the target file are maintained at multiple mirror files in the file system 6.

Yet further, if a mirror copy relationship is associated with a directory, as opposed to a particular file, then the mirror copy relationship may specify a mirror directory to copy and maintain mirror files for all files in the directory. In such implementations, the mirror copy files may have a same name as the files in the directory or name derived from the name of the files in the directory.

With the above described operations of FIG. 4, writes are allowed to proceed even if the target file to update is currently being copied as part of an initial mirror copy operation. This allows writes and user accesses to proceed while the target file is being copied.

With the described implementations, the security, space management, and data protection operations may be integrated with the file system so that the user does not need to install and learn a separate application program for each of these functions. Further, in certain implementations, the security, space management, and data protection policies are implemented in a transparent fashion to the users because they may be handled by a filter running in the kernel that automatically processes every access request to determine if one or more rules apply and manage conflicts between the rule requests.

Additional Implementation Details

The storage management operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In describe implementation, the security, space management, and data protection policies are defined in rules in a rule database. In alternative implementations, the security, space management, and data protection policies may be defined with attributes associated with a file or directory, so that the rule applies to the file or all files in a directory whose attributes have such rule. For instance, the user may associate security, space management, and data protection policies with the attributes defined for a directory of the file system. In certain operating systems, such as the MICROSOFT WINDOWS operating system, the attributes that may be assigned to a directory are accessed by right clicking a mouse button over the name of the directory displayed in a user interface window to display a menu, and then selecting the properties option displayed in the menu. (Microsoft and Windows are registered trademarks of Microsoft Corporation).

In certain described implementations, the file filter 10 is shown as a separate program component. The file filter 10 may be installed separately from the file system 6, such as a separately installed application program that runs when the operating system 4 and file system 6 are initialized and screens files the user is attempting to modify or move. Alternatively, the functionality of the file filter may be incorporated directly in the operating system and be made available as a feature of the file system installed with the operating system.

FIGS. 3 and 4 describe specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 5:
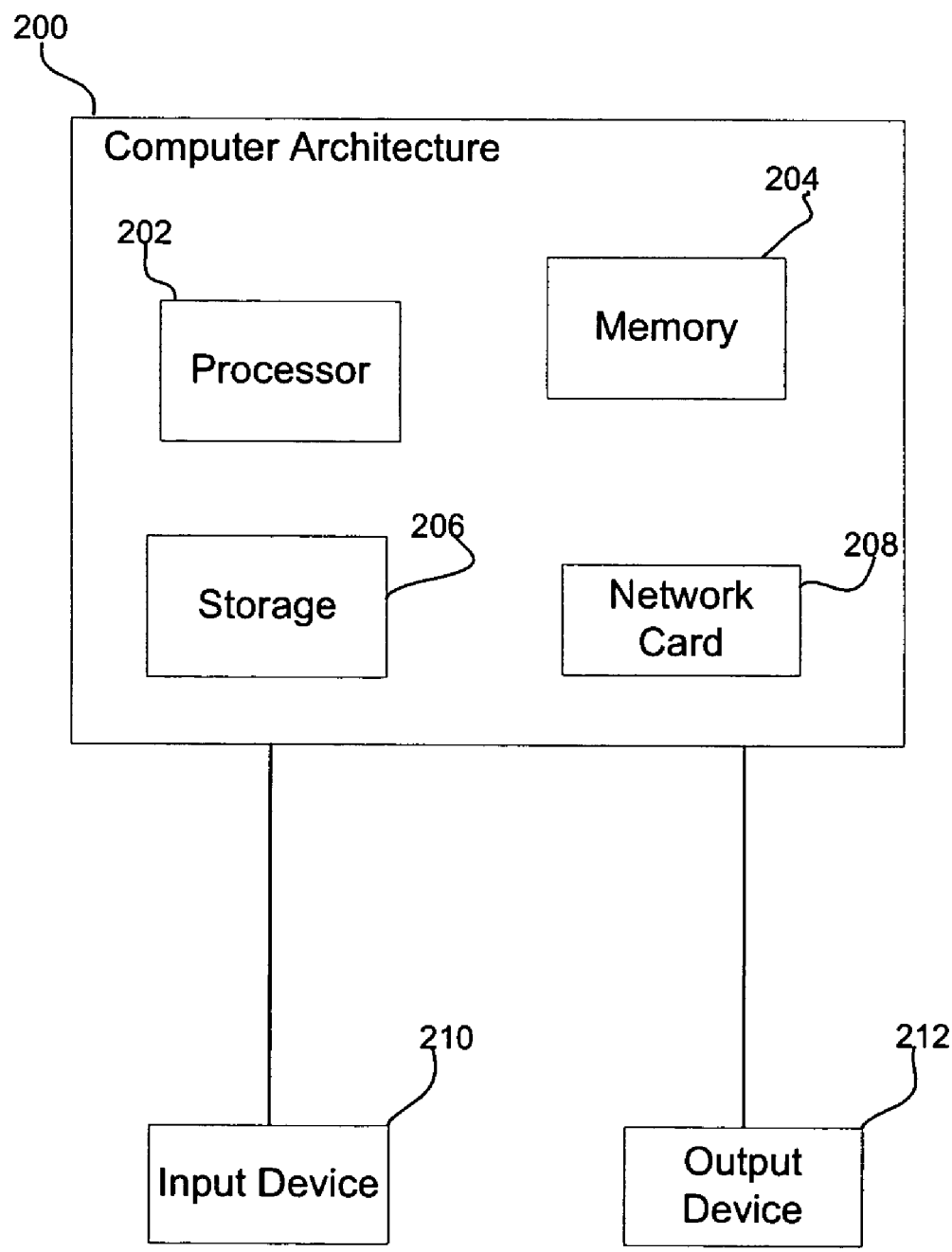
FIG. 5 illustrates a computing architecture that may be used to implement the computing environment described with respect to FIG. 1.

FIG. 5 illustrates one implementation of a computer architecture 200 of the host system 2 shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:
   processing a file request to add a target file to a file system;
   determining whether a rule specifies a file attribute indicating a file type attribute satisfied by the target file;
   in response to determining that the target file satisfies the file type attribute of the determined rule, determining whether a condition concerning a size threshold specified by the determined rule is satisfied;
   in response to determining that the condition is satisfied, performing an action specified by the determined rule, wherein the action comprises blocking the request to add the target file to the file system; and
   forwarding the file request to the file system to add the target file to the file system if the specified condition concerning the size threshold is not satisfied.

2. The method of claim 1, wherein determining whether one rule specifies the file attribute comprises processing file attributes associated with the target file to determine whether the file attributes are included in the rule.

3. The method of claim 1, wherein determining whether the rule specifies the file attribute comprises:
   processing a rules database including a plurality of rules, where each rule indicates a file attribute, a condition, and an action performed if the condition and file attribute are satisfied.

4. The method of claim 3, wherein the rules in the rules database implement space management, security, and data protection policies.

5. The method of claim 3, wherein a plurality of rules apply to the file request to determine whether to execute multiple actions in response to the file request.

6. The method of claim 1, wherein a file attribute of at least one additional rule is used to apply an action specified in the at least one additional rule to files having at least one of a plurality of attributes comprising: a file name, a file directory, and an application originating the request.

7. The method of claim 1, wherein at least one additional rule specifies a condition used to apply an action specified in the at least one additional rule when the condition is satisfied, wherein the condition in the at least one additional rule comprises at least one of a plurality of conditions comprising: a source of the file request originating from a specified application; a user initiating the file request specified as an authorized user; and available space in a storage system including the target file having a minimum available space.

8. The method of claim 1, wherein an attribute and condition specified in at least one additional rule check whether an application originating the file request is an authorized application, wherein an action specified by the at least one additional rule blocks the file request if the application is not authorized or passes the file request to the file system to execute if the application is authorized.

9. The method of claim 1, wherein the processing of the file request and the rule is performed by a program executing in a kernel of an operating system to process all requests directed to the file system, wherein the program comprises an extension of the file system.

10. A system comprising:
    a file system including a plurality of files;
    means for processing a file request to add a target file to the file system;
    means for determining whether a rule specifies a file attribute indicating a file type attribute satisfied by the target file;
    means for determining, in response to determining that the target file satisfies the file type attribute of the determined rule, whether a condition concerning a size threshold specified by the determined rule is satisfied;
    means for performing, in response to determining that the condition is satisfied, an action specified by the determined rule, wherein the action comprises blocking the request to add the target file to the file system; and means for forwarding the file request to add the target file to the file system if the specified condition concerning the size threshold is not satisfied.

11. The system of claim 10, wherein the means for determining whether the rule specifies the file attribute performs:

processing a rules database including a plurality of rules, where each rule indicates a file attribute, a condition, and an action performed if the condition and file attribute are satisfied.

12. The system of claim 11, wherein the rules in the rules database implement space management, security, and data protection policies.

13. The system of claim 10, wherein an attribute and condition specified in at least one additional rule check whether an application originating the file request is an authorized application, wherein an action specified by the at least one additional rule blocks the file request if the application is not authorized or passes the file request to the file system to execute if the application is authorized.

14. The system of claim 10, wherein the means for processing the file request and the rule comprises a program executing in a kernel of an operating system that processes all requests directed to the file system, wherein the program comprises an extension of the file system.

15. An article of manufacture for processing a file request to operate on a target file that is directed to a file system, wherein the article of manufacture causes operations to be performed, the operations comprising:

processing a file request to add a target file to a file system;

determining whether a rule specifies a file attribute indicating a file type attribute satisfied by the target file;

in response to determining that the target file satisfies the file type attribute of the determined rule, determining whether a condition concerning a size threshold specified by the determined rule is satisfied;

in response to determining that the condition is satisfied, performing an action specified by the determined rule, wherein the action comprises blocking the request to add the target file to the file system; and forwarding the file request to the file system to add the target file to the file system if the specified condition concerning the size threshold is not satisfied.

16. The article of manufacture of claim 15, wherein determining whether one rule specifies the file attribute comprises processing file attributes associated with the target file to determine whether the file attributes are included in the rule.

17. The article of manufacture of claim 15, wherein determining whether the rule specifies the file attribute comprises:

processing a rules database including a plurality of rules, where each rule indicates a file attribute, a condition, and an action performed if the condition and file attribute are satisfied.

18. The article of manufacture of claim 17, wherein the rules in the rules database implement space management, security, and data protection policies.

19. The article of manufacture of claim 17, wherein a plurality of rules apply to the file request to determine whether to execute multiple actions in response to the file request.

20. The article of manufacture of claim 15, wherein a file attribute of at least one additional rule is used to apply an action specified in the at least one additional rule to files having at least one of a plurality of attributes comprising: a file name, a file directory, and an application originating the request.

21. The article of manufacture of claim 15, wherein at least one additional rule specifies a condition used to apply an action specified in the at least one additional rule when the condition is satisfied, wherein the condition comprises at least one of a plurality of conditions comprising: a source of the file request originating from a specified application; a user initiating the file request specified as an authorized user; and available space in a storage system including the target file having a minimum available space.

22. The article of manufacture of claim 15, wherein an attribute and condition specified in at least one additional rule check whether an application originating the file request is an authorized application, wherein an action specified by the at least one additional rule blocks the file request if the application is not authorized or passes the file request to the file system to execute if the application is authorized.

23. The article of manufacture of claim 15, wherein the file request is to add the target file to the file system, and wherein the attribute and condition specified in the rule check whether the target file is of a specified type and size threshold, wherein the action blocks the file request to add the target file if the specified type and size threshold is exceeded or passes the file request to the file system to execute if the specified type is satisfied and the specified size threshold is not satisfied.

24. The article of manufacture of claim 15, wherein the processing of the file request and the rule is performed by a program executing in a kernel of an operating system to process all requests directed to the file system, wherein the program comprises an extension of the file system.

* * * * *